United States Patent

Nossek et al.

(10) Patent No.: US 12,243,201 B2
(45) Date of Patent: Mar. 4, 2025

(54) JOINT AUTO-EXPOSURE TONE-MAPPING SYSTEM

(71) Applicant: SAMSUNG ELECTRONICS CO., LTD., Suwon-si (KR)

(72) Inventors: Raz Zvi Nossek, Tel-Aviv (IN); Stas Dubinchik, Givatayim (KR); Roee Sfaradi, Nes-Ziona (IN); Yarden Sharabi, Kinneret Hamoshava (IN); Avi Zanko, Rishon LeZion (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 790 days.

(21) Appl. No.: 17/449,171

(22) Filed: Sep. 28, 2021

(65) Prior Publication Data

US 2023/0114798 A1 Apr. 13, 2023

(51) Int. Cl.
*G06T 5/92* (2024.01)
*G06T 3/40* (2006.01)
*G06T 5/70* (2024.01)
*G06T 5/73* (2024.01)

(52) U.S. Cl.
CPC ............ *G06T 5/92* (2024.01); *G06T 3/40* (2013.01); *G06T 5/70* (2024.01); *G06T 5/73* (2024.01); *G06T 2207/20076* (2013.01); *G06T 2207/20208* (2013.01)

(58) Field of Classification Search
CPC .... G06T 5/92; G06T 3/40; G06T 5/70; G06T 5/73; G06T 2207/20076; G06T 2207/20208; G06T 2207/20182; G06T 5/90
See application file for complete search history.

(56) References Cited

U.S. PATENT DOCUMENTS

| | | |
|---|---|---|
| 6,285,798 B1 | 9/2001 | Lee |
| 7,639,893 B2 | 12/2009 | Duan et al. |
| 8,144,985 B2 | 3/2012 | Ciurea et al. |
| 9,432,647 B2 * | 8/2016 | Tajbakhsh ............. H04N 23/88 |
| 9,621,767 B1 | 4/2017 | El Mezeni et al. |
| 10,192,517 B2 | 1/2019 | Ballestad et al. |
| 2011/0292246 A1 | 12/2011 | Brunner |

(Continued)

FOREIGN PATENT DOCUMENTS

EP 3044755 3/2019

OTHER PUBLICATIONS

Gabriel Eilertsen, "The high dynamic range imaging pipeline Tone-mapping, distribution, and single-exposure reconstruction", Jun. 2018. (Year: 2018).*

*Primary Examiner* — Phuoc Tran
(74) *Attorney, Agent, or Firm* — F. CHAU & ASSOCIATES, LLC

(57) ABSTRACT

The present disclosure describes compression of high dynamic range (HDR) images into low dynamic range (LDR) images while saving useful data in the HDR image. HDR images can be formed by merging images with different exposure times into a single image with high bit-depth to capture low light and bright data. LDR images can be generated using a joint auto-exposure and tone mapping system to capture useful details of the HDR input in and LDR output. Therefore, embodiments of the present disclosure create high quality LDR images from HDR images using data from the auto-exposure system of a sensor.

20 Claims, 12 Drawing Sheets

(56) References Cited

U.S. PATENT DOCUMENTS

2015/0022687 A1    1/2015  Galor
2016/0371822 A1*  12/2016  Le Pendu ................ C10G 2/31
2018/0047141 A1    2/2018  El Mezeni
2019/0362475 A1*  11/2019  Lin ........................... G06T 5/92

* cited by examiner

JOINT AUTO-EXPOSURE TONE-MAPPING SYSTEM

BACKGROUND

The following relates generally to digital image processing, and more specifically to tone-mapping.

Digital image processing refers to the task of using a computer to process or enhance digital images. For example, digital editing may be performed on images taken in dark environments to enhance the visibility of the image. In some cases, the dynamic range of low bit-depth images may be increased using quantitative approaches or algorithms. Brightness may be adjusted by appropriate differentiation in colors and lighting to make the image or objects in the image visually distinguishable.

Detailed images including regions of darkness, shadows, or bright lights may be captured using a high bit-depth. In some cases it is desirable to compress high bit-depth images to produce low bit-depth images for use in displays or machine vision tasks. However, the compressed images can lose clarity and contrast. For example, image sensors of a vehicle may capture an image close to a tunnel, and a region at the end of the tunnel may be substantially brighter than regions inside the tunnel. When such an image is compressed, details may be lost due to the high intensity contrast between the two different regions.

That is, conventional techniques for compressing high bit-depth images into low bit-depth images do not work well on images that capture low visibility scenarios. Therefore, there is a need in the art for improved image processing systems and methods which provide compressed low bit-depth images with increased clarity.

SUMMARY

The present disclosure describes compression of high dynamic range (HDR) images into low dynamic range (LDR) images while saving useful data in the HDR image. HDR images are formed by merging images with different exposure times into a single image with high bit-depth to capture low light and bright data. The high bit-depth images are presented simultaneously. In some cases, display units present low bit-depth images. Therefore, embodiments of the present disclosure create high quality LDR images from HDR images using data from the auto-exposure system of a sensor.

A method, apparatus, non-transitory computer-readable medium, and system for tone-mapping are described. One or more embodiments of the method, apparatus, non-transitory computer-readable medium, and system include computing a virtual gain based on image statistics, computing a luminosity probability density function based on the image statistics, generating a tone-mapping function based on the virtual gain and the luminosity probability density function, and converting an HDR image to an LDR image based on the tone-mapping function.

A method, apparatus, non-transitory computer-readable medium, and system for tone-mapping are described. One or more embodiments of the method, apparatus, non-transitory computer-readable medium, and system include collecting a plurality of exposures using an image sensor, generating an HDR image by combining the plurality of exposures, computing a virtual gain based on image statistics from the image sensor, adjusting the virtual gain to obtain a target brightness for the LDR image, adjusting an analog gain to obtain the target brightness for the LDR image after adjusting the virtual gain, computing a luminosity probability density function based on the image statistics, generating a tone-mapping function based on the virtual gain and the luminosity probability density function, and converting the HDR image to an LDR image based on the tone-mapping function.

An apparatus, system, and method for tone-mapping are described. One or more embodiments of the apparatus, system, and method include an auto-exposure component configured to compute a virtual gain based on image statistics, a probability density function component configured to compute a luminosity probability density function based on the image statistics, a tone mapping curve (TMC) component configured to generate a tone-mapping function based on the virtual gain and the luminosity probability density function, and a tone-mapping component convert an HDR image to an LDR image based on the tone-mapping function.

DETAILED DESCRIPTION

The present disclosure describes systems and methods for compressing high dynamic range (HDR) images into low dynamic range (LDR) images. One or more embodiments include a joint auto-exposure and tone-mapping system which applies edits or gains to adjust the brightness at portions of an image. In some examples, a gain policy controls the brightness of the image.

Image enhancement may include changes in the luminance or colors of an image to make features of the image more distinguishable. For example, an auto-exposure process may be used to adjust parameters that determine the brightness of the image. Tone-mapping can then be used to map the pixel data to compressed pixel data. Conventional camera systems perform auto-exposure and tone-mapping as separate processes. For example, tone-mapping may be performed after the auto-exposure parameters of the camera sensor are set. However, performing auto-exposure and tone-mapping separately can result in LDR images that do not capture important features of an HDR input.

Embodiments of the present disclosure jointly execute tone-mapping and auto-exposure algorithms. As a result, these systems can capture real-life scenes whose features are lost in conventional tone-mapping process. For example, a joint auto-exposure and tone mapping system can be used to capture scenes involving both extremely dark areas and bright lights. One or more embodiments calculate auto-exposure gains to enhance the brightness or contrast of an image. Additionally or alternatively, changes to the exposure time of the camera can be used to reduce the effects of blur in the image. In some cases, a tone-mapping algorithm applies a desired amount of contrast to enhance the visual distinguishability of the image.

By using the unconventional method of joint auto-exposure and tone mapping, image processing systems can handle dynamic changes and provide temporal stability while reducing hardware and software complexity. One or more embodiments of the present disclosure may be used to compress HDR images to LDR images while saving useful data in the HDR image. The tone-mapping and auto-exposure systems may be connected and share data. As a result, in some cases the tone-mapping and auto-exposure systems are considered a single unit.

In some examples, a joint system of auto-exposure and tone-mapping may enable algorithms for driver assistance, or for other entertainment and information systems in the automotive industry, as well as in other industries and applications. An application of the inventive concept in the automotive context is described with reference to FIGS. 1 to 3. Details regarding the architecture of an example tone-mapping system is described with reference to FIGS. 4 to 7. A description of an example tone-mapping process is described with reference to FIGS. 8 to 12.

Automotive Imaging System

Figure 1:
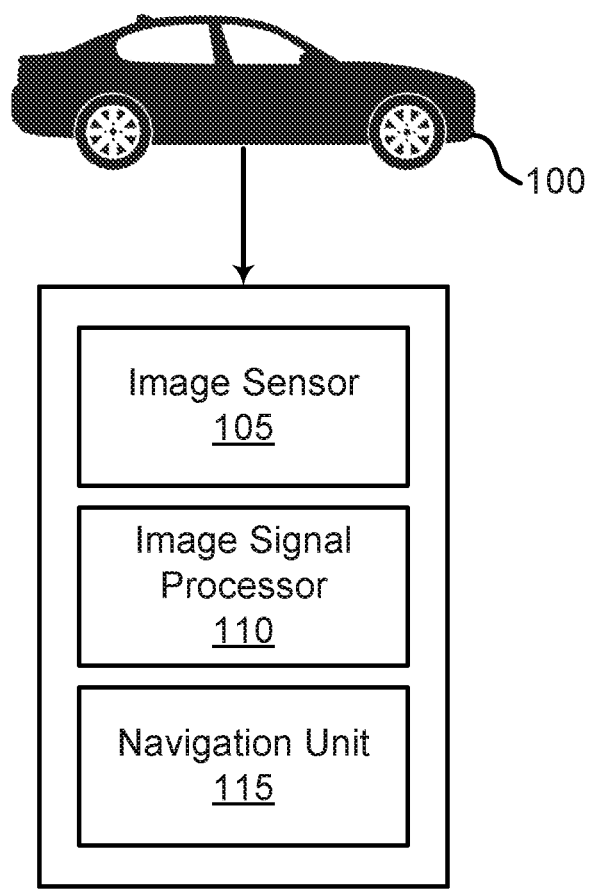
FIG. 1 shows an example of an automotive imaging system according to aspects of the present disclosure.

FIG. 1 shows an example of an automotive imaging system according to aspects of the present disclosure. The example shown includes vehicle 100, image sensor 105, image signal processor 110, and navigation unit 115. In addition to, or as an alternative to, use in the navigation unit 115, the output of the image signal processor 110 can be used for other systems in the vehicle 100 such as for display or recording of images. Furthermore, the image processing systems described herein are not limited to the automotive context.

In the example scenario of FIG. 1, the vehicle 100 uses one or more image sensors 105 to collect imaging information of the surrounding area. For example, the image sensor 105 may be used to collect one or more HDR images of a scene. The image sensor 105 may be a charge-coupled device (CCD), a complementary metal-oxide semiconductor (CMOS), or the like. An HDR image is considered a high quality image, capturing most or all of the light present if a photographer were to be at the image scene. However, HDR images are large and complex, and may my difficult to process due to the large size. Therefore, for some applications, it is useful to convert HDR images into LDR images.

The collected images from the image sensor 105 are processed in the image signal processor 110 and the processed image data is provided to applications such as the navigation unit 115, or other systems such as safety or entertainment systems. In some cases, the image signal processor 110 compresses an image to produce an LDR image. The LDR image may include a limited exposure range. Since the file size is lower, resulting in easier processing.

A vehicle 100 may be any device used for transportation, and is an example of an application of an image processing system of the present disclosure. For example, the vehicle 100 may be a car, truck, or bus, but the present disclosure is not limited thereto, and the vehicle 100 can be any other device used for mobility. However, the vehicle 100 is used as an example, and the image processing systems described herein are not limited to the automotive context.

An image sensor 105 is a sensor used to detect information to create an image by converting light or other electromagnetic radiation, such as infrared signals, into electrical signals. Image sensors 105 are used in analog and digital imaging devices, such as digital cameras, mobile phones, security systems, radar, and the like.

According to some embodiments, image sensor 105 collects a set of exposures using an image sensor 105. In some examples, image sensor 105 generates the high dynamic range (HDR) image by combining the set of exposures.

An image signal processor 110 (ISP) is a type of media processor or specialized digital signal processor used for image processing in digital cameras. Image signal processor 110 is an example of, or includes aspects of, the corresponding element described with reference to FIG. 4.

A navigation unit 115 is a computing system that aids in navigation. Navigation systems may be entirely onboard the vehicle 100 or vessel that the system is controlling (for example, on the ship's bridge) or located elsewhere, making use of radio or another signal transmission to control the vehicle 100 or vessel. In some cases, the navigation unit 115 uses high quality LDR images for navigation (e.g., for identifying and staying within a lane). In some examples, systems other than the navigation unit 115 use LDR images.

Figure 2:
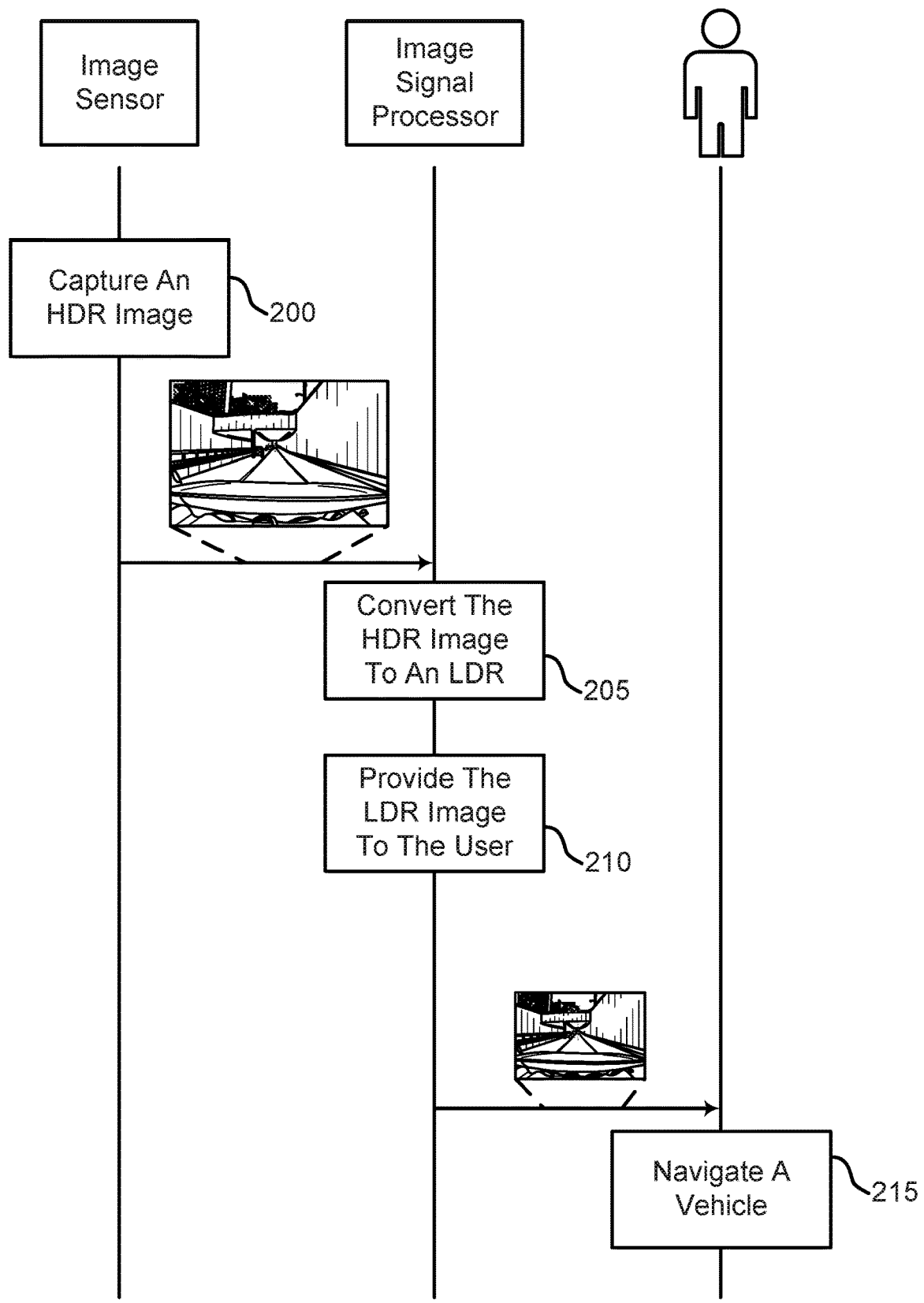
FIG. 2 shows an example of a process for automotive imaging according to aspects of the present disclosure.

FIG. 2 shows an example of a process for automotive imaging according to aspects of the present disclosure. At step 200, the image sensor captures an HDR image. For example, an automobile camera may capture an image of a driving scene with a forward facing image sensor.

In some examples, an image sensor captures the input image using a provided pixel integration time parameter (also known as exposure time) and analog gain parameter. The pixel integration time parameter, analog gain parameter, and digital gain control the brightness level of an image at the input to ISP. Analog gain, digital gain, and statistics of the image can be used calculate an adjusted value of the exposure time. In some cases, exposure time can be used to determine the analog gain and the digital gain.

The image statistics may include histograms, thumbnail images, etc. In some cases, the gain and exposure parameters may be calculated by defining the desired brightness of the output image (i.e., target brightness). For example, the gain and exposure parameters can be calculated using the average of pixels and channels in the image.

At step 205, the image signal processor converts the captured HDR image to an LDR image. In some cases, converting the captured HDR image to an LDR image is based on a joint auto-exposure and tone-mapping function as described with reference to FIGS. 8 through 12.

The auto-exposure algorithm sets the combination of the exposure time, analog gain, and digital gain such that the brightness of the scene after applying the parameters reaches the target brightness. Multiple combinations of integration time, analog gain, and digital gain may be used to achieve the target brightness. The auto-exposure algorithm increases the value of integration time, followed by analog gain and digital gain. The integration time and analog gain are limited by constraints of the image sensor, for example, frame rate for integration time and circuit design for analog gain. Therefore, the system divides the total gain between the three mechanisms (i.e., integration time, analog gain, and digital gain), which decreases the noise level. In some cases, when the noise level is considered, the integration time is increased to the maximum value.

In some cases, high integration times may cause blur due to camera motion or local motion of objects in the scene. Therefore, the effect of blur may be reduced using limits on the exposure time by the user or camera manufacturer.

In some cases, the tone-mapping curve algorithm is operated (i.e., on completion of auto-exposure operation) after the image sensor parameters are set, and the image is captured. The tone-mapping curve algorithm applies a tone-mapping curve (using local image statistics) to achieve the desired level of contrast in the image.

For example, wide dynamic range (WDR) image sensors include a sensor image that comprises a pixel-wise combination of multiple images captured with different settings of integration time and analog gain (i.e., referred to as fused images). The process of combining images with different settings (i.e., images which are in control of the auto-exposure mechanism) is called HDR recombination or HDR merge. In some cases, the setup of image acquisition results in a non-standard SNR response. For example, the SNR (signal-to-noise ratio) response (i.e., standard response) for a single exposure scheme is controlled by a photon-shot noise.

In some cases, values greater than the data width of the sensor pixel are saturated when applying the analog gain. In some cases, the HDR merger preferably takes values of corresponding pixels taken from frames with a shorter integration time. The pixels with the shorter integration time are characterized with reduced signal-to-noise ratio than pixels that are saturated due to the analog gain. In some cases, a pixel generated from a short exposure may have high analog gain or no analog gain at all. As a result, the output can pixels with low signal-to-noise ratio values. In some examples, images captured using a short exposure will tend to have higher analog gain.

One or more embodiments of the present disclosure show signal-to-noise ratio as a function of illumination when the gain is applied before the WDR fusion and when the gain is applied after the WDR fusion. In some cases, the gain may be applied after the WDR fusion. In some cases, the gain applied after the merger is a digital gain that does not impact SNR. However, refraining from applying an analog gain can improve the SNR by enabling the use of long exposure times.

One or more embodiments include a system where the digital gain is increased before increasing the analog gain. The digital gain is applied as part of the tone-mapping curve to the output of the WDR fusion block. The auto-exposure system selects an appropriate combination of exposure time, analog gain, and digital gain. The analog gain and the pixel integration time are set to the image sensor, and the digital gain is provided as an input to the tone-mapping system, which uses the digital gain with scene statistics to produce the tone-mapping curve that integrates with the digital gain.

At step 210, the image signal processor provides the LDR image to a user, or to a functional component of the vehicle such as a navigation system or a safety system. In the example scenario of FIG. 1, the user may be controlling an automobile. The image may be provided to the user via a navigation system with a display system to convey the captured image or scene.

At step 215, the user navigates a vehicle based on the LDR image. In some cases, the navigation system deciphers the image using principles such as object recognition, image processing, or the like and may automatically navigate the automobile.

Figure 3:
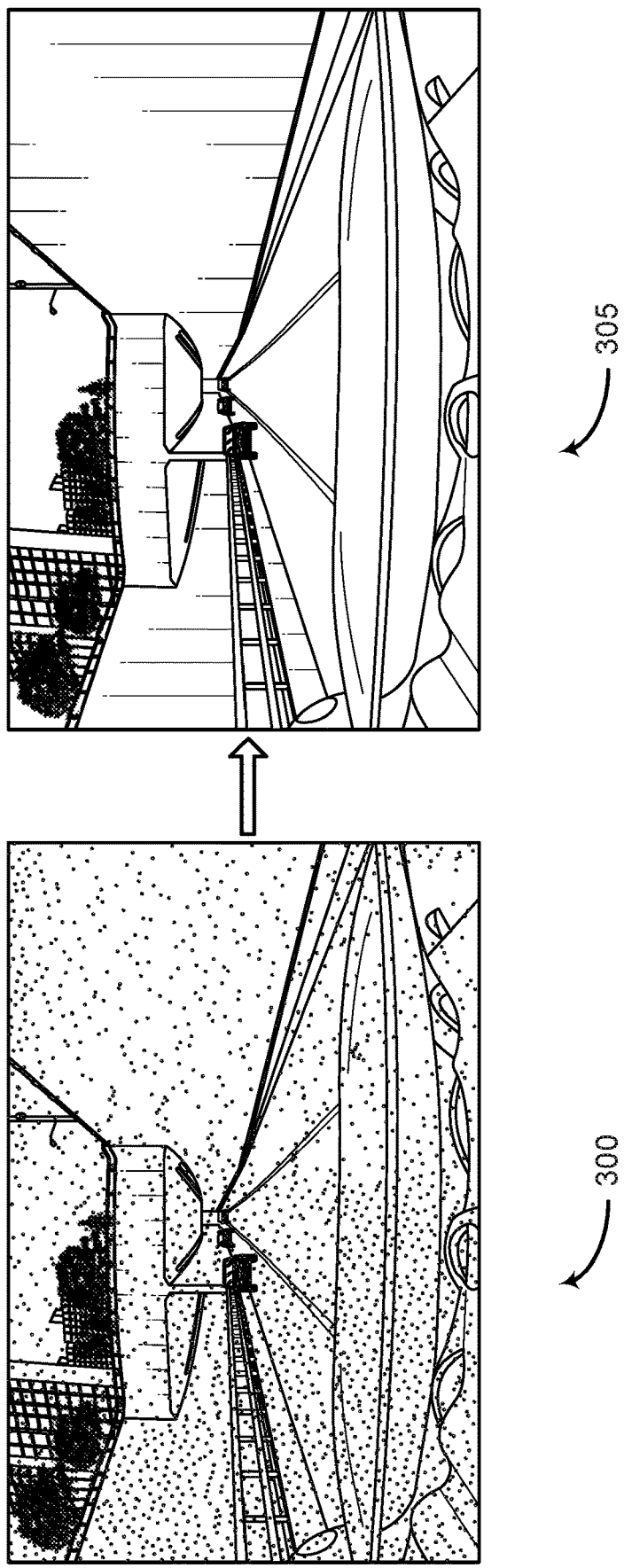
FIG. 3 shows examples of compressed image processing according to aspects of the present disclosure.

FIG. 3 shows examples of compressed image processing according to aspects of the present disclosure. The example shown includes a depiction of a conventional result 300 generated using conventional image processing and a depiction of a high quality result 305 generated joint auto-exposure and tone mapping. In some cases, cars and other objects in the conventional result 300 are difficult to distinguish from the background. Furthermore, the conventional result 300 may include "burnt out" areas that contain little or no useful data.

Image sensors in the automotive environment may be used to capture HDR images that are challenging to capture with an LDR image (e.g., dark scenes). For example, an LDR image may not appropriately display the inside and outside of a tunnel simultaneously. Similarly, an image may not clearly display a scenario of driving at night on a dark road and not saturating the traffic lights. The systems prevalent in mobile devices treat tone-mapping and auto exposure separately. In some cases, the output of the image signal processing (ISP) has limited bit width (i.e., outputs 8-12 bits for displays, or 16 bits for machine-vision tasks).

Embodiments of the present disclosure include an image with high bit-depth produced by an image sensor (e.g., captured in 20-24 bits in the automotive industry) to capture scenarios with darkness (e.g., presence of a tunnel or a dark road). A tone-mapping system then transforms the HDR images to LDR images. The tone-mapping system reflects the content of a real scene and preserves the contrast of the HDR image. One or more embodiments calculate a tone-mapping curve jointly based on an auto-exposure mechanism.

The conventional result 300 of FIG. 3 shows a scenario where tone-mapping and auto-exposure algorithms are executed or treated separately. Images may be depicted as too dark, or the colors may be incorrectly parsed. One or more embodiments of the present disclosure execute tone-mapping and auto-exposure algorithms as a single unit, shown as the high quality result 305 of FIG. 3. The tone-mapping and auto-exposure algorithms are executed by describing a source-driven scheme and introducing a mechanism that calculates the appropriate gains to apply on the image. Additionally, an optimized method describes the position of application of the tone-mapping and auto-exposure algorithms on the ISP chain.

The auto-exposure algorithm sets the combination of the integration time, analog gain, and digital gain such that the brightness of the scene after applying the parameters reaches the target brightness. Multiple combinations of integration time, analog gain, and digital gain may be used to achieve the target brightness. For example, in some cases the auto-exposure algorithm adjusts the value of integration time, and then the auto-exposure algorithm is followed by the application of digital gain, which is followed by the application of analog gain. According to embodiments of the present disclosure, integration System Architecture An apparatus, system, and method for tone-mapping are described. One or more embodiments of the apparatus, system, and method include an auto-exposure component configured to compute a virtual gain based on image statistics, a probability density function component configured to compute a luminosity probability density function based on the image statistics, a TMC component configured to generate a tone-mapping function based on the virtual gain and the luminosity probability density function, and a tone-mapping component converts an HDR image to an LDR image based on the tone-mapping function.

Some examples of the apparatus, system, and method further include an analog auto-exposure component configured to adjust an analog gain to obtain a target brightness for the LDR image after adjusting the virtual gain to obtain the target brightness for the LDR image. Some examples of the apparatus, system, and method further include a component configured to generate a strictly monotonous function (e.g., as a gamma function).

Some examples of the apparatus, system, and method further include computing a luminosity cumulative distribution function based on the luminosity probability density function. Some examples further include scaling an input of the luminosity cumulative distribution function based on the virtual gain to obtain a scaled luminosity cumulative distribution function, wherein the tone-mapping function is generated based on the scaled luminosity cumulative distribution function.

Some examples of the apparatus, system, and method further include an image sensor configured to collect a plurality of exposures using an image sensor. Some examples of the apparatus, system, and method further include an image statistics component configured to collect image statistics from the image sensor.

Some examples of the apparatus, system, and method further include computing a plurality of local tone-mapping functions based on the virtual gain and the luminosity probability density function, wherein each of the plurality of local tone-mapping functions corresponds to an average luminosity value. Some examples further include computing a local average luminosity value for a region surrounding a pixel of the HDR image. Some examples further include selecting the tone-mapping function for the pixel from among the plurality of local tone-mapping functions based on the local average luminosity value and the pixel luminosity value corresponding to the tone-mapping function.

Some examples of the apparatus, system, and method further include a noise reduction component configured to generate a smooth version of the HDR image by denoising the HDR image. Some examples further include a sharp adder configured to generate a sharp version of the HDR image by sharpening the smooth version of the HDR image, wherein the tone-mapping function is applied to the sharp version of the HDR image based on the smooth version of the HDR image.

Some examples of the apparatus, system, and method further include a white balance component configured to compute white balance data for the HDR image, wherein the tone-mapping function is generated based on the white balance data.

Figure 4:
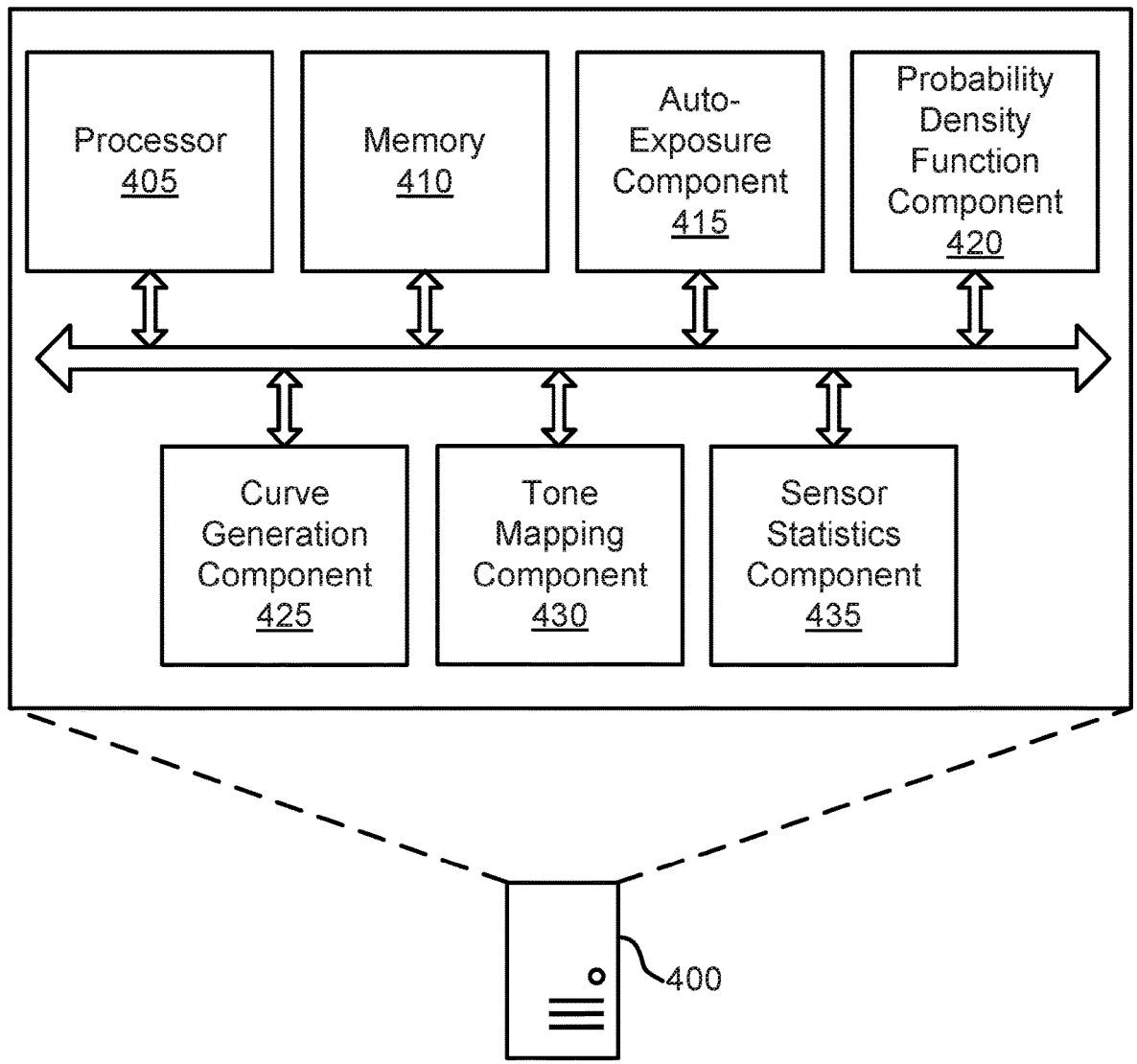
FIG. 4 shows an example of an image signal processor apparatus according to aspects of the present disclosure.

FIG. 4 shows an example of an image signal processor 400 apparatus according to aspects of the present disclosure. In one embodiment, image signal processor 400 includes processor 405, memory 410, auto-exposure component 415, probability density function component 420, TMC component 425, tone-mapping component 430, and image statistics component 435.

The image signal processor 400 can be a type of media processor or specialized digital signal processor used for image processing in a digital cameras. The image signal processor 400 may perform operations such as demosaicing, noise reduction, auto exposure, autofocus, auto white balance and image sharpening designed for digital processing and image quality enhancement. The image signal processor 400 is an example of, or includes aspects of, the corresponding element described with reference to FIG. 1.

A processor 405 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor is configured to operate a memory array using a memory controller. In other cases, a memory controller is integrated into the processor. In some cases, the processor is configured to execute computer-readable instructions stored in a memory to perform various functions. In some embodiments, a processor includes special purpose components for modem processing, baseband processing, digital signal processing, or transmission processing.

Examples of a memory 410 include random access memory (RAM), read-only memory (ROM), or a hard disk. Examples of memory devices include solid-state memory and a hard disk drive. In some examples, memory is used to store computer-readable, computer-executable software, including instructions that, when executed, cause a processor to perform various functions described herein. In some cases, the memory contains, among other things, a basic input/output system (BIOS) that controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some embodiments, auto-exposure component 415 computes a virtual gain based on image statistics. In some cases, computing a virtual gain is based on image statistics from the image sensor. Auto-exposure component 415 is an example of, or includes aspects of, the corresponding element described with reference to FIG. 5.

According to some embodiments, the probability density function component 420 computes a luminosity probability density function based on the image statistics. Probability density function component 420 is an example of, or includes aspects of, the corresponding element described with reference to FIG. 6.

According to some embodiments, tone mapping curve (TMC) algorithm component 425 (also referred to as TMC component) generates a tone-mapping function based on the virtual gain and the luminosity probability density function. In some examples, TMC component 425 computes a luminosity cumulative distribution function. In some examples, TMC component 425 scales an input of the luminosity cumulative distribution function based on the virtual gain to obtain a scaled luminosity cumulative distribution function, where the tone-mapping function is generated based on the scaled luminosity cumulative distribution function. In some examples, TMC component 425 computes a set of local tone-mapping functions based on the virtual gain and the luminosity probability density function, where each of the set of local tone-mapping functions corresponds to an average luminosity value. In some examples, TMC component 425 computes a local average luminosity value for a region surrounding a pixel of the HDR image.

In some examples, TMC component 425 selects the tone-mapping function for a pixel from among the set of local tone-mapping functions based on the local average luminosity value and the average luminosity value corresponding to the tone-mapping function. In some examples, TMC component 425 selects a set of sample values from among a set of luminosity values in a range to determine by a bit width of the HDR image. In some examples, TMC component 425 generates a set of linear functions located between the set of sample values to approximate a continuous tone-mapping function by comparing a value of each linear function with a corresponding value of the continuous tone-mapping function, where the tone-mapping function is generated based on the set of linear functions. According to some embodiments, TMC component 425 generates a tone-mapping function based on the virtual gain and the luminosity probability density function.

In some examples, two TMCs may be set: one for dark regions and one for bright regions. These TMCs may be piece-wise linear functions, and may be used together with the average pixel value to generate more other TMCs that are also piece-wise linear.

According to some embodiments, tone-mapping component 430 converts an HDR image to an LDR image based on the tone-mapping function. In some examples, the HDR image has a higher bit width than the LDR image.

According to some embodiments, image statistics component 435 is configured to collect image statistics from the image sensor. Image statistics component 435 is an example of, or includes aspects of, the corresponding element described with reference to FIG. 6.

Figure 5:
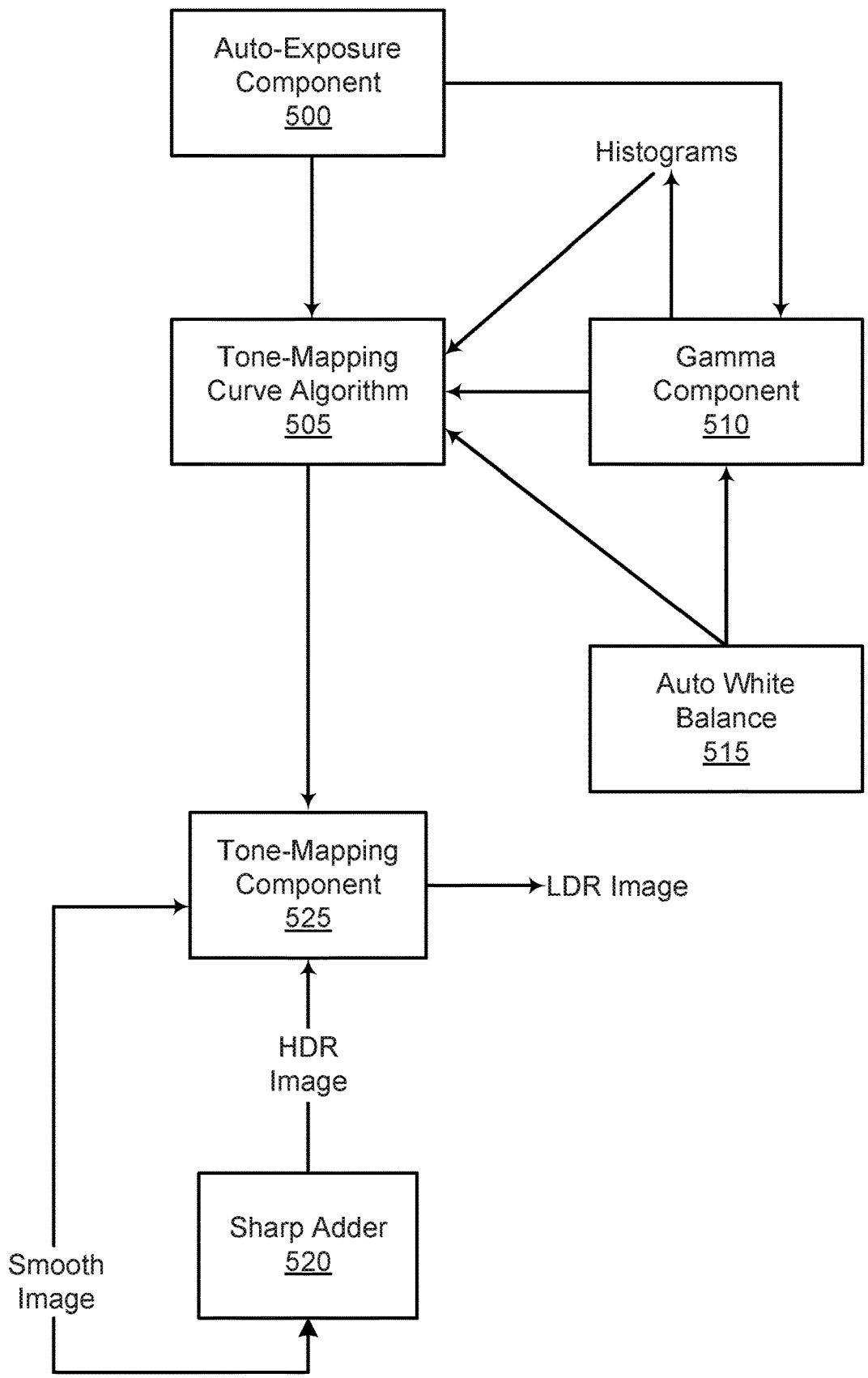
FIG. 5 shows an example of a joint auto-exposure and tone-mapping system according to aspects of the present disclosure.

FIG. 5 shows an example of a joint auto-exposure and tone-mapping system according to aspects of the present disclosure. The example shown includes auto-exposure component 500, tone-mapping curve algorithm 505, gamma component 510, auto white balance 515, sharp adder 520, and tone-mapping component 525.

Auto-exposure component 500 computes a virtual gain based on image statistics. In some cases, computing a virtual gain is based on image statistics from the image sensor. The virtual gain is provided to the tone-mapping curve algorithm 505 and to a non-linear function (e.g., a non-linear strictly monotonous function). Auto-exposure component 500 is an example of, or includes aspects of, the corresponding element described with reference to FIG. 4.

The tone-mapping curve algorithm 505 applies a desired amount of contrast to enhance the visual distinguishability of the image. Tone-mapping curve algorithm 505 is an example of, or includes aspects of, the corresponding element described with reference to FIG. 6.

According to some embodiments, gamma component 510 applies a non-linear function (i.e., a gamma function) to a luminosity of the HDR image to obtain the luminosity probability density function, which is then applied to one or more histograms and the tone-mapping curve algorithm 505.

The auto white balance 515 (also referred to as white balance or a white balance component) is configured to compute white balance data for the HDR image, wherein the tone-mapping function is generated based on the white balance data.

According to some embodiments, sharp adder 520 generates a sharp version of the HDR image by sharpening the smooth version of the HDR image, where the tone-mapping function is applied to the sharp version of the HDR image based on the smooth version of the HDR image. Sharp adder 520 is an example of, or includes aspects of, the corresponding element described with reference to FIG. 7.

The tone-mapping component 525 converts an HDR image to an LDR image based on the tone-mapping function and a smooth image. Tone-mapping component 525 is an example of, or includes aspects of, the corresponding element described with reference to FIGS. 6 and 7.

Figure 6:
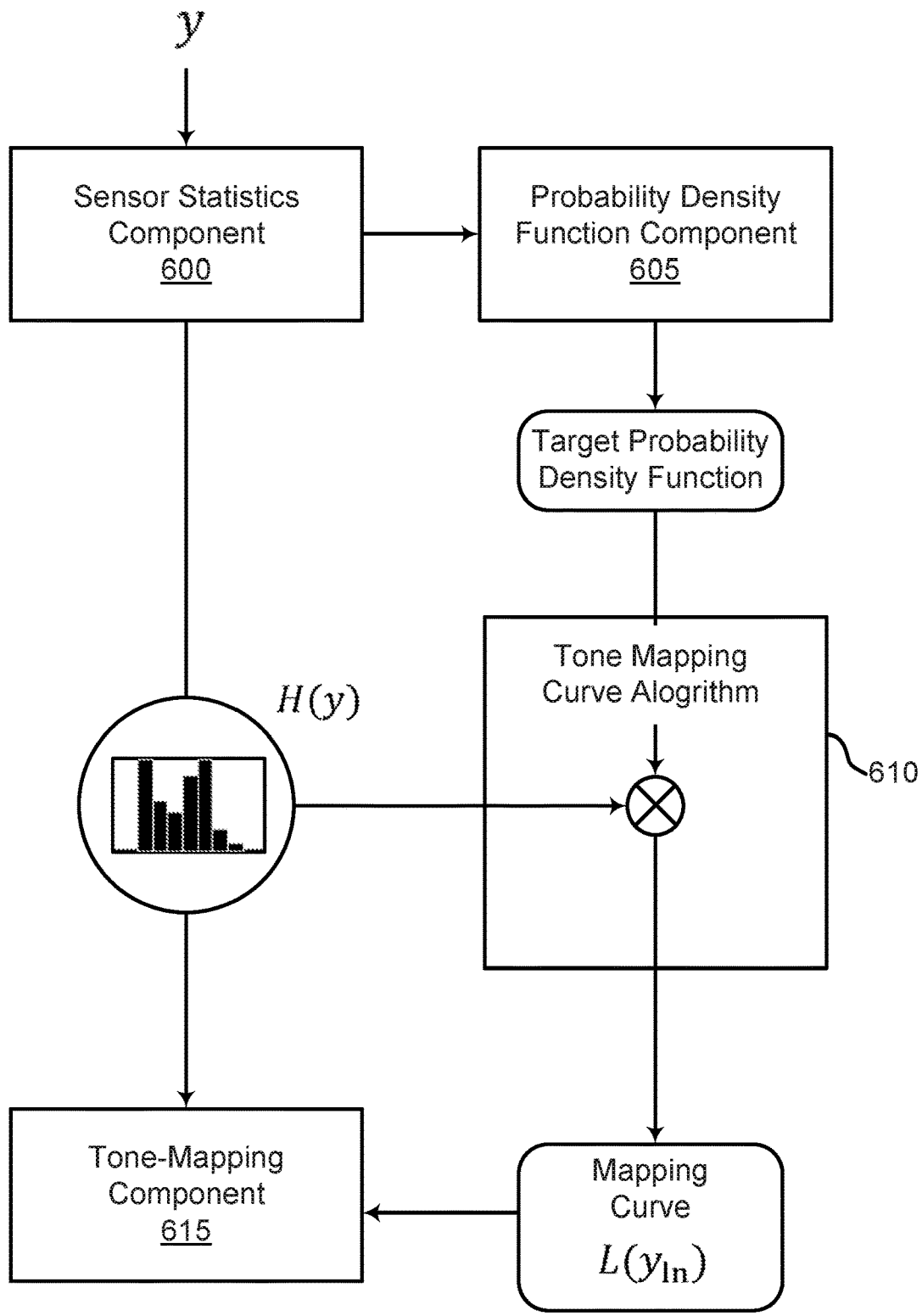
FIG. 6 shows an example of tone-mapping according to aspects of the present disclosure.

FIG. 6 shows an example of tone-mapping according to aspects of the present disclosure. The example shown includes image statistics component 600, probability density function component 605, tone-mapping curve algorithm 610, and tone-mapping component 615.

In some cases, a histogram matching process is performed using a single target probability density function (PDF). In some cases, using the target brightness (TB) gain can saturate bright regions. As a result, bright regions are restored by filtering of target histogram. Filtering can also help preserve contrast in the image. Histogram-matching reduces the saturation of bright areas and reduce contrast in other areas when using a single tone-mapping curve.

The result of the histogram matching process is a mapping function (e.g., a TMC) that is applied to the input signal. A representation of the function for possible inputs uses an approximation performed using a piecewise linear approximation with points such that the distance is a power of two. In some cases, a greedy algorithm may be used for sampling f(x) with S sampling points with a power of two distances between points. For example, "optimal points" may be identified that result in a minimum error (as measured by some metric or cost function).

In an example, the algorithm uses a new segment that is [0,2k], where k is the bit-width of the source signal. New segment tips are connected to linear mapping L(x) at each iteration. Next, the cost of new segments is determined by sampling at K equally spaced points and calculating $\max_k |f(x_k) - L(x_k)|$. Therefore, the cost of the segment is the maximal difference between the linear mapping and the sampled function at the K points. A new sample point is added as the middle of the segment with the highest cost, and the algorithm is repeated to reach S sampling points.

The image statistics component 600 is configured to collect image statistics from the image sensor. Example statistics may be mean and variance values, minimum and maximum pixel values and their location, skewness, kurtosis, standard deviation, mean, median, mode, and the like. If should be known to those skilled in the art as to standard and non-standard image statistics. Image statistics component 600 is an example of, or includes aspects of, the corresponding element described with reference to FIG. 4.

The probability density function component 605 is configured to compute a luminosity probability density function based on the image statistics. Probability density function component 605 is an example of, or includes aspects of, the corresponding element described with reference to FIG. 4.

The Tone-mapping curve algorithm 610 applies a desired amount of contrast to enhance the visual distinguishability of the image. The tone-mapping curve algorithm 610 is operated (i.e., on completion of auto-exposure operation) after the image sensor parameters are set and the image is captured. The tone-mapping curve algorithm 610 applies a tone-mapping curve (using local image statistics) to achieve the desired level of contrast in the image. Tone-mapping curve algorithm 610 is an example of, or includes aspects of, the corresponding element described with reference to FIG. 5.

Tone-mapping component 615 converts an HDR image to an LDR image based on the tone-mapping function. Tone-mapping component 615 is an example of, or includes aspects of, the corresponding element described with reference to FIGS. 5 and 7.

Accordingly, one or more embodiments of the present disclosure include a local tone-mapping curve algorithm that incorporates local data when applying the tone-mapping curve on pixel values. Different tone-mapping curves are used on the same Y values if suggested by a characteristic in the near neighborhood. Therefore, the notion of $Y_{avg}$ (Y average) is introduced. $Y_{avg}$ is an indicator resulted from a coarse segmentation process of the image according to illumination conditions. $Y_{avg}$ is calculated for each pixel separately. A gain lower than TB gain is applied for higher values of $Y_{avg}$ (i.e., bright and sunny areas), and thus saturation of areas that are not saturated in the original input image is avoided. In some examples, a two-variables mapping curve $y_{out}=L(Y_{in}, Y_{avg})$ is used.

$Y_{avg}$ is calculated as a weighted average of the Y values in a neighborhood around each pixel. The location of edges in the surrounding area are used. For example, an image may depict the emergence from a tunnel where the outside of the tunnel is brighter than the inside of the tunnel which may not be seen in the $Y_{avg}$ map. Therefore, TB gain is applied on the values of $Y_{avg}$. Thus $Y_{avg}$ relates to the depiction of an image when applying TB gain. Additionally, the areas where a lower gain may be applied are identified.

Figure 7:
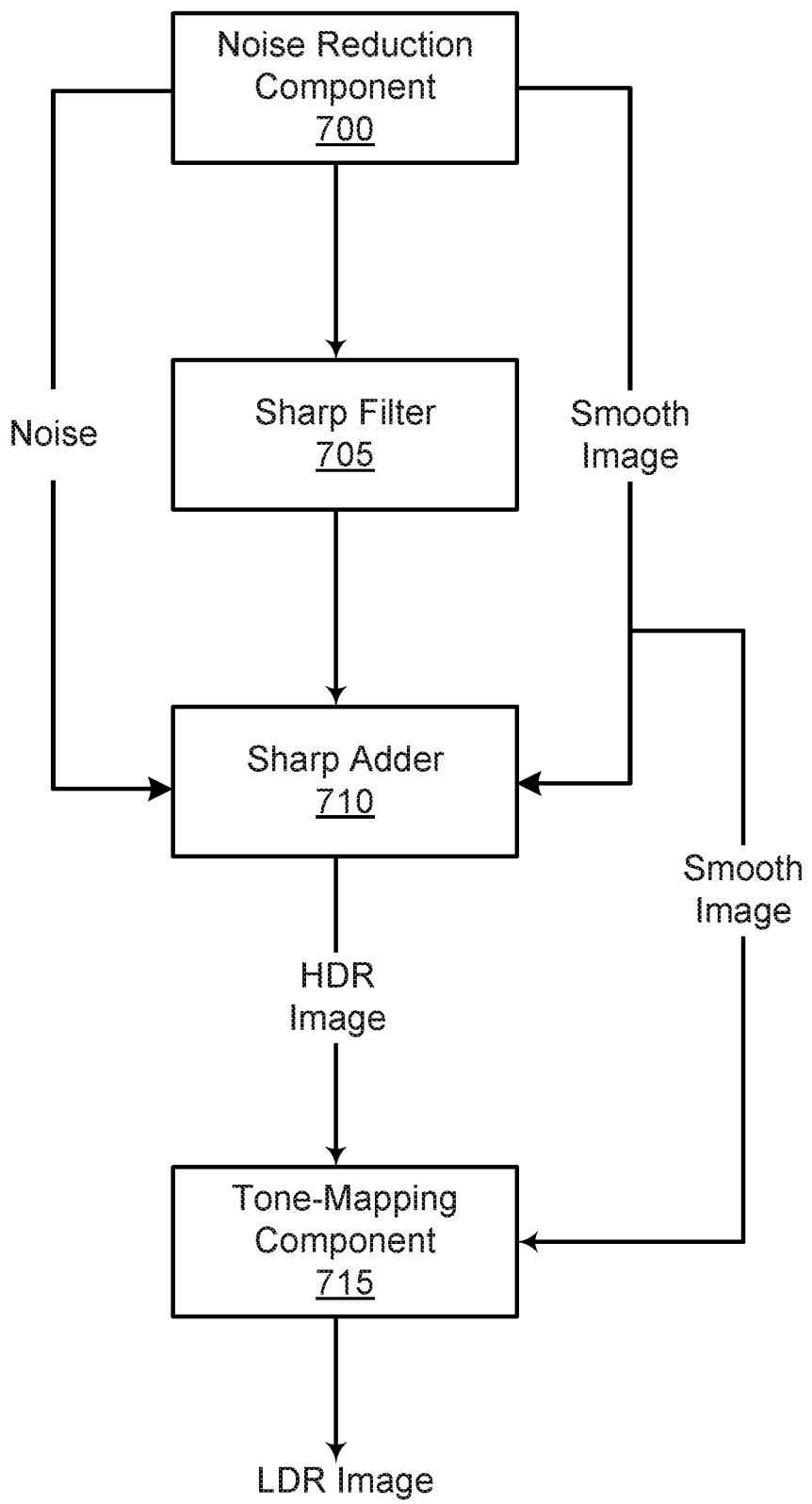
FIG. 7 shows an example of a smooth image input for a tone-mapping component according to aspects of the present disclosure.

FIG. 7 shows an example of a smooth image input for a tone-mapping component according to aspects of the present disclosure. The example shown includes noise reduction component 700, sharp filter 705, sharp adder 710, and tone-mapping component 715.

According to some embodiments, an HDR image may be input to the noise reduction component 700, which generates a smooth version of the HDR image by denoising the HDR image. In some embodiments, a sharp filter 705 can further filter the image to produce an input for the sharp adder 710. In some embodiments, the sharp filter 705 is not included.

The sharp adder 710 is configured to generate a sharp version of the HDR image by sharpening the smooth version of the HDR image. The tone-mapping function can be applied to the sharp version of the HDR image based on the smooth version of the HDR image. Sharp adder 710 is an example of, or includes aspects of, the corresponding element described with reference to FIG. 5.

Accordingly, one or more embodiments of the present disclosure separate the image into two types (i.e., smooth image and detail image) before applying the tone-mapping curve. The smooth image includes low frequency data from the original image and the detail image includes high frequency data. The tone-mapping curve is applied on the smooth image, i.e., the input variable $Y_{in}$ which applies the tone-mapping curve is from the smooth image. The gain determined by the tone-mapping curve is then applied on the original image. As the smooth image has fewer gradients, (i.e., there is less distinction between edges and objects) the applied tone-mapping at flat areas and edges which are spatially close may be similar. As a result, contrast is gained from the rest of the ISP system and is preserved in the LDR image. One or more embodiments of the present disclosure include increased hardware efficiency as tone-mapping involves less computation.

The smooth image is provided to the tone-mapping component 715, which converts the HDR image to an LDR image based on the tone-mapping function. Tone-mapping component 715 is an example of, or includes aspects of, the corresponding element described with reference to FIGS. 5 and 6.

Tone-Mapping

A method, apparatus, non-transitory computer-readable medium, and system for tone-mapping are described. One or more embodiments of the method, apparatus, non-transitory computer-readable medium, and system include computing a virtual gain based on image statistics, computing a luminosity probability density function based on the image statistics, generating a tone-mapping function based on the virtual gain and the luminosity probability density function, and converting an HDR image to an LDR image based on the tone-mapping function.

Some examples of the method, apparatus, non-transitory computer-readable medium, and system further include adjusting the virtual gain to obtain a target brightness for the LDR image. Some examples further include adjusting an analog gain to obtain the target brightness for the LDR image after adjusting the virtual gain. Some examples of the method, apparatus, non-transitory computer-readable medium, and system further include applying a non-linear function to a luminosity of the HDR image to obtain the luminosity probability density function.

Some examples of the method, apparatus, non-transitory computer-readable medium, and system further include computing a luminosity cumulative distribution function based on the luminosity probability density function. Some examples further include scaling an input of the luminosity cumulative distribution function based on the virtual gain to obtain a scaled luminosity cumulative distribution function, wherein the tone-mapping function is generated based on the scaled luminosity cumulative distribution function. Some examples of the method, apparatus, non-transitory computer-readable medium, and system further include collecting a plurality of exposures using an image sensor. Some examples further include generating the HDR image by combining the plurality of exposures.

Some examples of the method, apparatus, non-transitory computer-readable medium, and system further include computing a plurality of local tone-mapping functions based on the virtual gain and the luminosity probability density function, wherein each of the plurality of local tone-mapping functions corresponds to an average luminosity value. Some examples further include computing a local average luminosity value for a region surrounding a pixel of the HDR image. Some examples further include selecting the tone-mapping function for the pixel from among the plurality of local tone-mapping functions based on the local average luminosity value and the average luminosity value corresponding to the tone-mapping function.

Some examples of the method, apparatus, non-transitory computer-readable medium, and system further include selecting a plurality of sample values from among a plurality of luminosity values in a range determined by a bit width of the HDR image. Some examples further include generating a plurality of linear functions located between the plurality of sample values to approximate a continuous tone-mapping function by comparing a value of each linear function with a corresponding value of the continuous tone-mapping function, wherein the tone-mapping function is generated based on the plurality of linear functions.

Some examples of the method, apparatus, non-transitory computer-readable medium, and system further include generating a smooth version of the HDR image by denoising the HDR image. Some examples further include generating a sharp version of the HDR image by sharpening the smooth version of the HDR image, wherein the tone-mapping function is applied to the sharp version of the HDR image based on the smooth version of the HDR image. In some examples, the HDR image has a higher bit width than the LDR image. Some examples of the method, apparatus, non-transitory computer-readable medium, and system further include computing white balance data for the HDR image, wherein the tone-mapping function is generated based on the white balance data.

Figure 8:
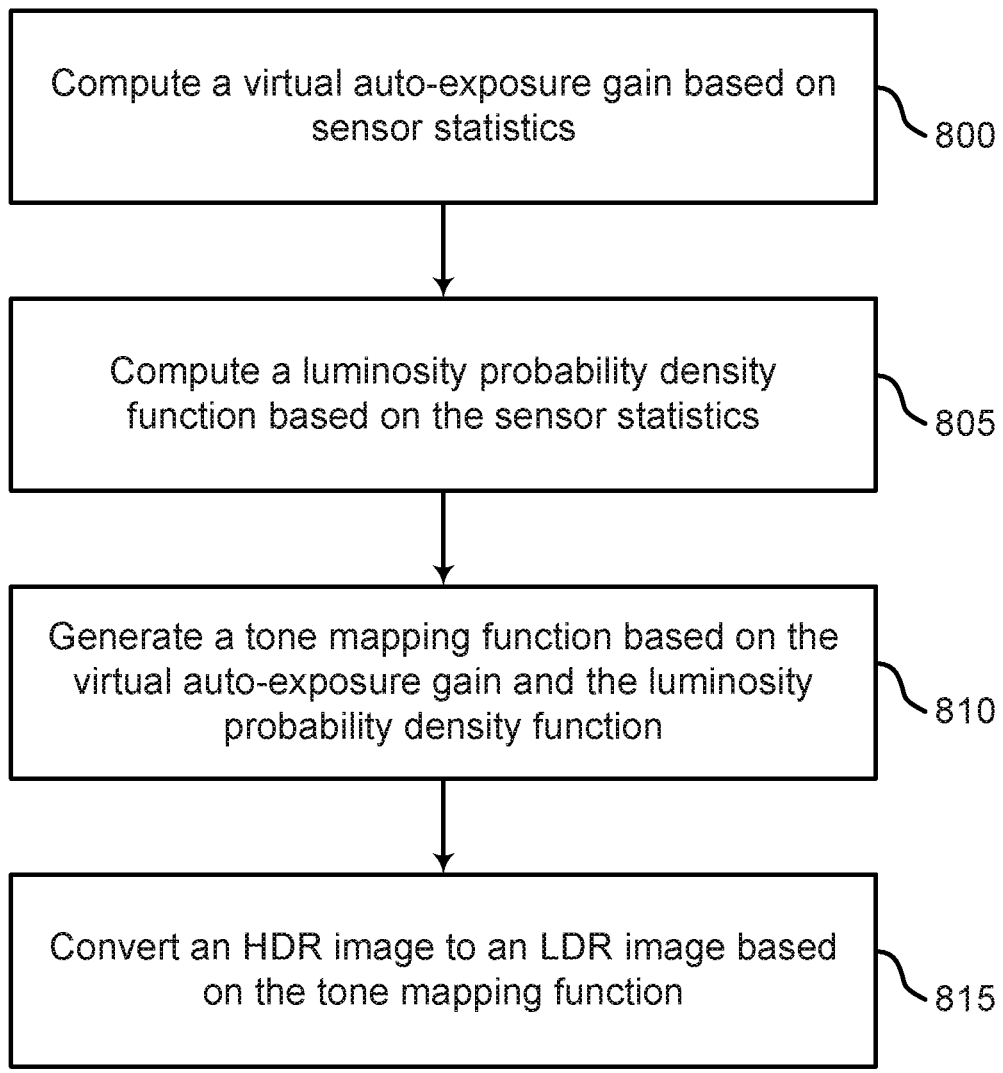
FIG. 8 shows an example of a process for tone-mapping according to aspects of the present disclosure.

FIG. 8 shows an example of a process for tone-mapping according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Exposure time refers to the pixel integration time parameter used by the sensor to capture input image. Exposure parameters may be calculated by defining the desired brightness of the output image (i.e., target brightness). The effect of blur may be reduced using limits on the exposure time by the user or camera manufacturer. The auto-exposure system selects appropriate combination of exposure time, analog gain, and digital gain.

The sensor captures the input image using a provided pixel integration time parameter (also known as exposure time) and analog gain parameter. The pixel integration time parameter, analog gain parameter, and digital gain control the brightness level of an image at the input to ISP. The analog gain and the pixel integration time are set to the sensor, and the digital gain is provided as an input to the tone-mapping system which uses the digital gain with scene statistics to produce the tone-mapping curve that integrates with the digital gain.

The tone-mapping function transforms HDR images to LDR images. The tone-mapping system reflects the content of the real scene and preserves the contrast of the HDR image. The tone-mapping function applies a tone-mapping curve (using local image statistics) to achieve the desired level of contrast in the image.

At operation 800, the system computes a virtual gain based on image statistics. The virtual gain may be adjusted to obtain a target brightness for the LDR image. The virtual gain may be adjusted to obtain a target brightness for the LDR image, and the tone-mapping function may be based on the virtual gain. Additionally, or alternatively, one or more local tone-mapping functions may be determined based on the virtual gain and the luminosity probability density function.

An auto-exposure algorithm may be used to establish integration time, analog gain, and digital gain to determine a virtual gain, such that the brightness of the scene after applying the parameters reaches a target brightness. One or more combinations of integration time, analog gain, and digital gain may be used to achieve the target brightness. The auto-exposure algorithm increases the value of integration time, followed by analog gain and digital gain. In some cases, the operations of this step refer to, or may be performed by, an auto-exposure component as described with reference to FIGS. 4 and 5.

At operation 805, the system computes a luminosity probability density function based on the image statistics. The luminosity probability density function may be a histogram describing the distribution of luminosity of pixels. Additionally, or alternatively, luminosity probability density function provides a count of pixels at varying luminosities, which may be considered histogram luminosity values.

In some cases, the histogram luminosity values of pixels of the input image are calculated and matched to a target histogram. The histogram is an example of a probability density function (PDF) of the luma values, and may be used to calculate a cumulative distribution function (CDF). However, other PDF examples may be used (e.g., a continuous PDF). In some cases, the operations of this step refer to, or may be performed by, a probability density function component as described with reference to FIGS. 4 and 6.

At operation 810, the system generates a tone-mapping function based on the virtual gain and the luminosity probability density function. The tone-mapping function is generated based on the scaled luminosity cumulative distribution function and is used to transform HDR images to LDR images.

The tone-mapping function reflects the content of the real scene and preserves the contrast of the HDR image. A tone-mapping function may be used to apply a tone-mapping curve (using local image statistics) to achieve the desired level of contrast in the image. In some cases, the operations of this step refer to, or may be performed by, a curve generation component as described with reference to FIG. 4.

At operation 815, the system converts an HDR image to an LDR image based on the tone-mapping function. In short, HDR images may be compressed to LDR while depicting a real scenario and preserving the data of the HDR image.

The tone-mapping system of the present disclosure compresses the HDR image into a high quality LDR image, where a tone-mapping function (i.e., algorithm) applies a desired amount of contrast to enhance the visual distinguishability of the image. In some cases, the operations of this step refer to, or may be performed by, a tone-mapping component as described with reference to FIGS. 4, 5, and 9.

Figure 9:
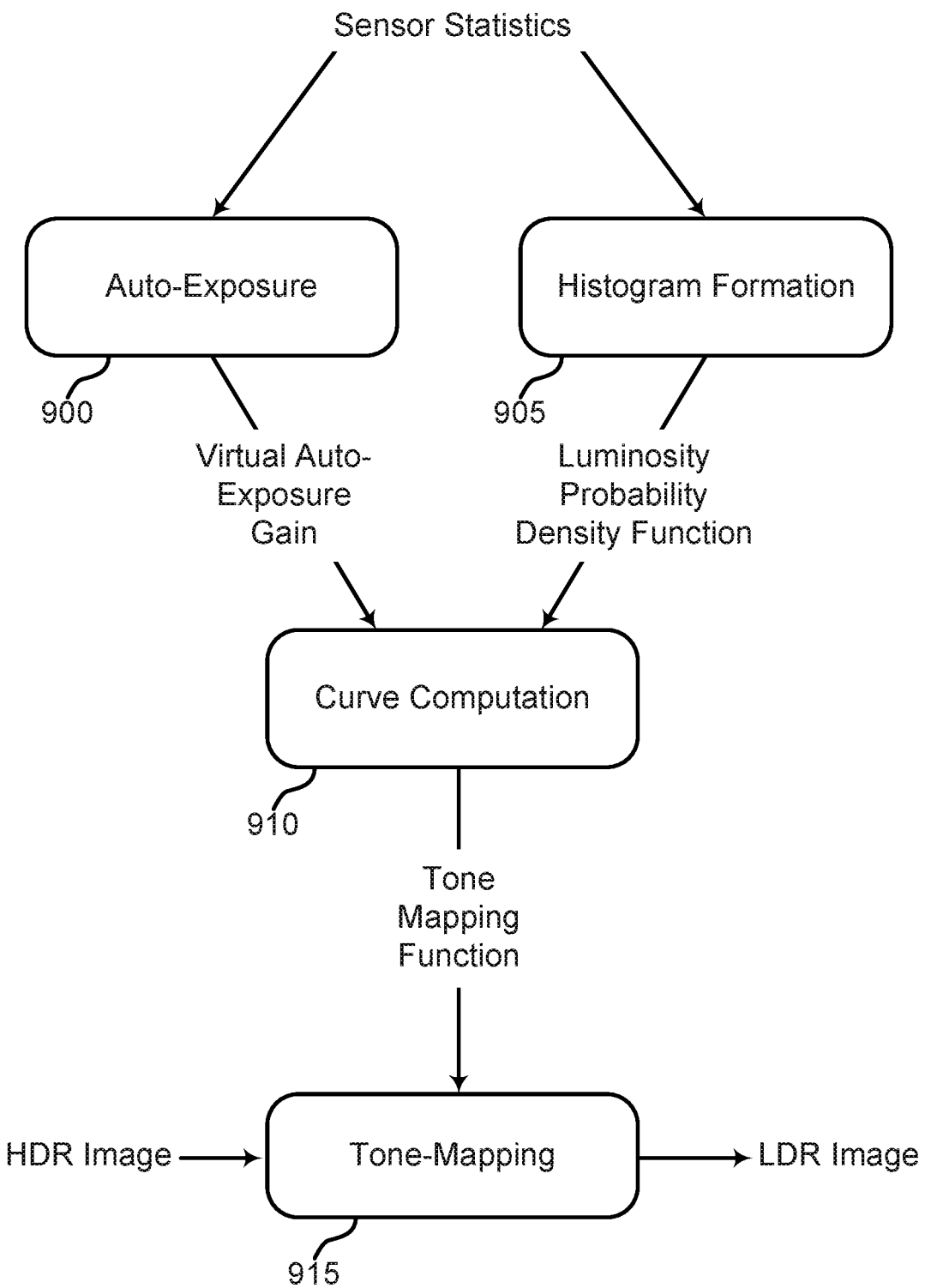
FIG. 9 shows an example of a process for tone-mapping according to aspects of the present disclosure.

FIG. 9 shows an example of a process for tone-mapping according to aspects of the present disclosure. The example shown includes auto-exposure 900, histogram formation 905, curve computation 910, and tone-mapping 915.

Image statistics are used for auto-exposure 900 and histogram formation 905. The image statistics may include histograms, thumbnail images, etc. In some cases, the gain and exposure parameters may be calculated by defining the desired brightness of the output image (i.e., target brightness (TB)). The gain and exposure parameters are calculated using the average of pixels and channels in the image. Additionally, image statistics may be mean and variance values, minimum and maximum pixel values and their location, skewness, kurtosis, positive and negative pixels, standard deviation, mean, median, mode, and the like.

Virtual gain may be computed based on image statistics from the image sensor and the virtual gain may be adjusted to obtain a target brightness for the LDR image. The luminosity probability density function describes a histogram including the distribution of luminosity of pixels. Additionally, or alternatively, luminosity probability density function provides a count of pixels at varying luminosities, which may be considered histogram luminosity values.

The virtual gain and luminosity probability density function are applied to the curve computation 910, where a tone-mapping function (or tone-mapping curve) is determined. The tone-mapping 915 receives the HDR image and converts an HDR image to an LDR image based on the tone-mapping function and a smooth image.

Figure 10:
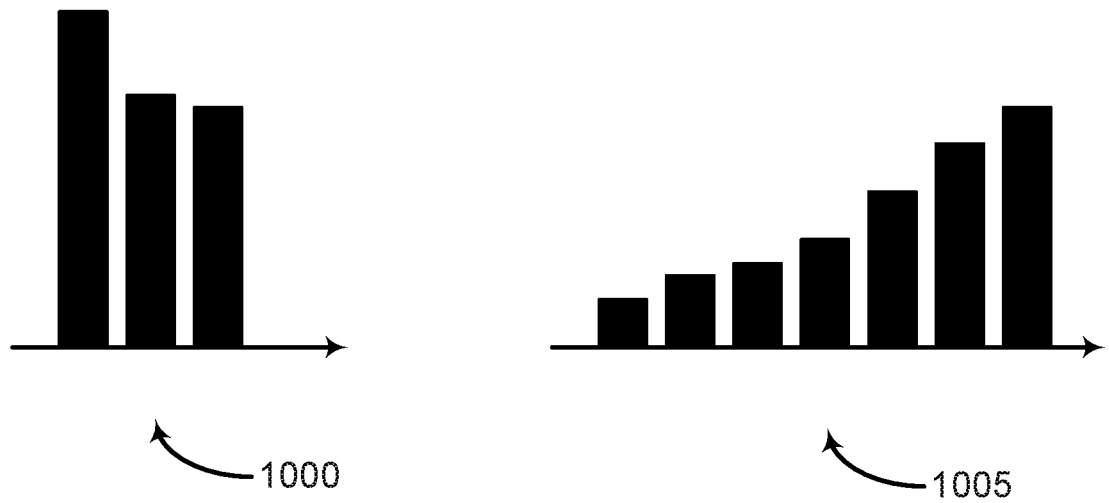
FIG. 10 shows an example of non-linear histogram collection according to aspects of the present disclosure.

FIG. 10 shows an example of non-linear histogram collection according to aspects of the present disclosure. The example shown includes linear-spaced histogram 1000 and γ-space histogram 1005.

Histogram luminosity values of pixels (i.e., the luminosity probability density function) of the input image are calculated and matched to a target histogram. The histogram is considered as a probability density function (PDF) of the luma values and used to calculate cumulative distribution function (CDF).

The tone-mapping curve is the result of a histogram matching process. In some cases, the histogram luminosity values of pixels of the input image are calculated and matched to a target histogram. The histogram is considered as a probability density function (PDF) of the luma values and used to calculate cumulative distribution function (CDF). The histogram data is collected by applying a monotonic increasing mapping (e.g., log, simple gain, etc.) to the image before the collection of the histogram to obtain an evenly spaced histogram. The histogram of the original image is referred to as a linear-spaced histogram 1000 and the histogram after applying the mapping is referred to as a γ-space histogram 1005. Thus, the probability density functions of the input image and the image after gamma are related by the properties of random variable transformation.

For example, if F is the CDF of the luma of the input image, and $\tilde{F}$ is the CDF of the image after the function γ is applied to the image luma, then the following equation holds.

$$F_{y_{in}}(Y) \triangleq P(y_{in} < Y) \underset{\gamma\ is\ monotonic}{=} P(\gamma(y_{in}) < \gamma(Y)) = P(\tilde{y}_{in} < \gamma(Y)) = \tilde{F}(\gamma(Y)) \quad (1)$$

where Y is the luma. According to the gain appliance policy, γ is chosen as γ(y)≈g·log y, where log is used for good resolution in dark scenes and g is the histogram gain which may be chosen (in the auto-exposure) such that the signal is not saturated. The γ-space histogram 1005 is given as input to the tone-mapping system which converts the histogram to linear-space.

The target histogram in the histogram matching approach represents a histogram with appropriate contrast and brightness for the input image. The target histogram is computed in the tone-mapping system using source histogram of the original image. The digital gain is computed from auto-exposure by performing some manipulation. The process of creating the target histogram includes applying the gain (on the input linear-spaced histogram 1000), denoted as virtual gain (or target brightness gain), such that the output image achieves target brightness. The histogram is then filtered to increase the contrast of populated areas in the histogram. The target histogram is manipulated in the histogram matching process, such that the brightness of the image is the same as when virtual gain is applied on the image. $F_\gamma(y)$, the cumulative distribution function of the input is estimated in linear space using the collected histogram γ-space H(y). The scaled histogram is computed that may be collected when virtual-gain $G_{AE-v}$ is applied using the cumulative distribution function $F_\gamma(y)$. The cumulative distribution function of $F_{G_{AE-v}}(y)$ can be given as (taking the clipping effect into consideration)

$$F_{G_{AE-v}Y}(y) = \begin{cases} F_Y\left(\dfrac{y}{G_{AE-v}}\right) & y < \dfrac{y_{max}}{G_{AE-v}} \\ 1 & o.w. \end{cases} \quad (2)$$

A scaled histogram $H_{GA-v}(y)$ with a mean according to the value of target brightness is calculated using the cumulative distribution function $F_{G_{AE-v}}(y)$. The target histogram is given by filtering the histogram $H(G_{AE-v}y)$ with a certain low pass filter (LPF). The filter provides temporal stabilization caused by transitions of energy between the quantized bins. In some cases, the filter reduces the effect of clipping by expanding the last bin into the lower range of the histogram. Additionally, the low pass filter spans the energy of the signal on the largest possible support to obtain maximum resolution given the histogram bin-width.

The integral of the target histogram after low pass filter, H ($G_{AE-LPF}y$) is equal to 1. The method used for the low pass filter near the boundaries of the histogram (zeros padding, duplicate, cycle, etc.) influences the preservation of the histogram integral (or mass) as the input. For example, an input histogram may contain holes, i.e., the histogram comprises multiple blobs. The area (or mass) of each blob may not be preserved after the low pass filter. In some cases, the global mass loss of the probability density function integral may be compensated for by normalizing the output. Alternatively, global mass may be preserved by applying output and input corrections to the mass of the histogram bins near the boundaries.

Output correction comprises two stages. The low pass filter with zero padding is applied at the edges in the first stage. The amount lost due to in the first stage is added to each bin in the second stage. As a result, each bin donates mass to other bins and keeps the residual to ensure a constant total mass.

Input correction includes the normalization of the input histogram before applying the low pass filter on the normalized input. Bin values at the input edges are changed by a factor such that the output after the low pass filter has a mass equal to the original histogram. The factor is the computed ratio between the actual contribution and the contribution of the bin if the bin was not located near the edge. Input correction ensures that each bin donates equal mass to the neighbors so the total mass and proportion between mass of different blobs does not change.

Accordingly, a method, apparatus, non-transitory computer-readable medium, and system for tone-mapping are described. One or more embodiments of the method, apparatus, non-transitory computer-readable medium, and system include collecting a plurality of exposures using an image sensor, generating an HDR image by combining the plurality of exposures, computing a virtual gain based on image statistics from the image sensor, adjusting the virtual gain to obtain a target brightness for the LDR image, adjusting an analog gain to obtain the target brightness for the LDR image after adjusting the virtual gain, computing a luminosity probability density function based on the image statistics, generating a tone-mapping function based on the virtual gain and the luminosity probability density function, and converting the HDR image to an LDR image based on the tone-mapping function.

Figure 11:
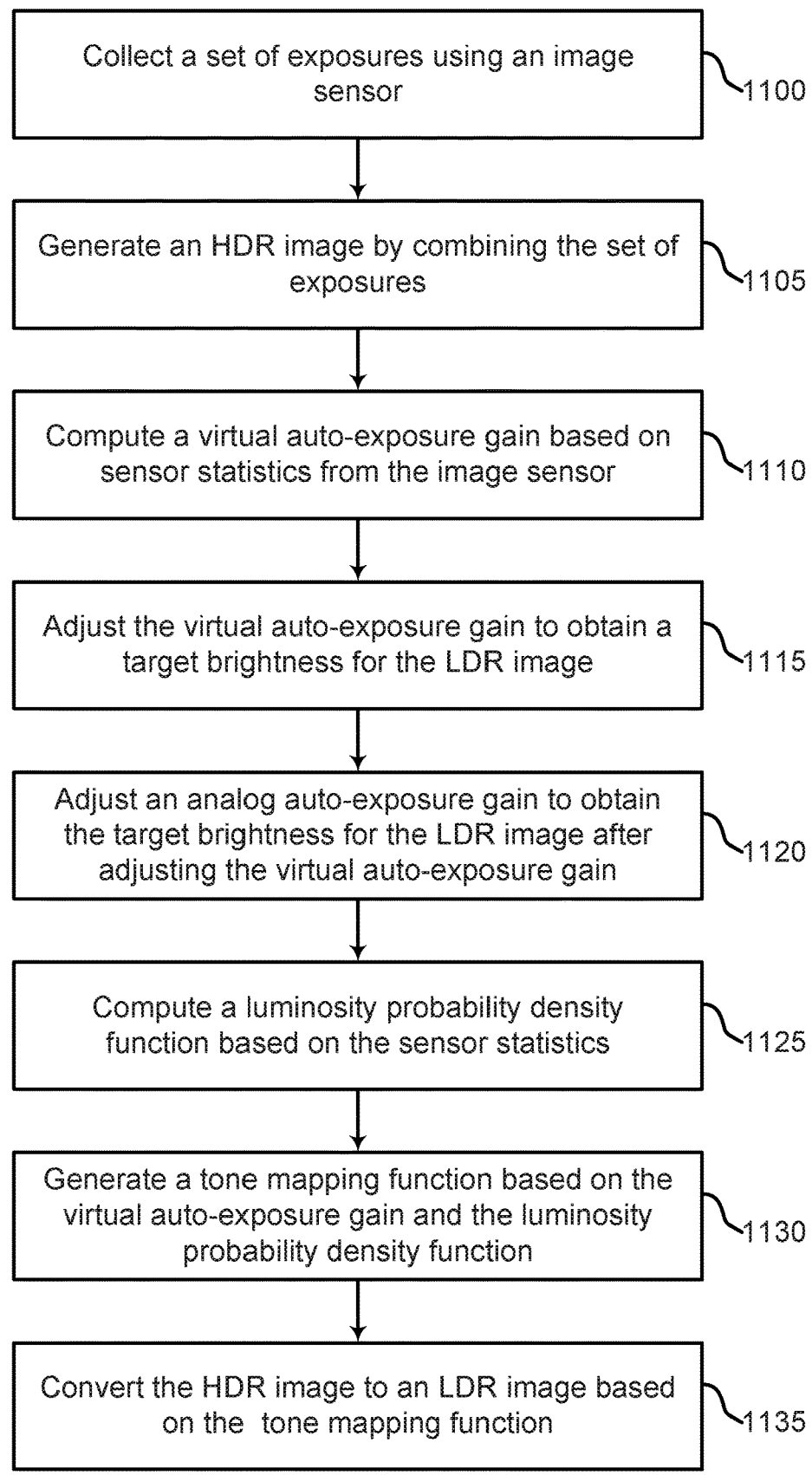
FIG. 11 shows an example of process for converting the high dynamic range (HDR) image to a low dynamic range (LDR) image according to aspects of the present disclosure.

FIG. 11 shows an example process for converting the HDR image to an LDR image according to aspects of the present disclosure. In some examples, these operations are performed by a system, including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1100, the system collects a set of exposures using an image sensor. In some examples, the image sensor generates the HDR image by combining the set of exposures. In some cases, the operations of this step refer to, or may be performed by, an image sensor as described with reference to FIG. 1.

At operation 1105, the system generates an HDR image by combining the set of exposures. In some cases, the operations of this step refer to, or may be performed by, an image sensor as described with reference to FIG. 1.

At operation 1110, the system computes a virtual gain based on image statistics from the image sensor. In some cases, computing a virtual gain is based on image statistics from the image sensor The operations of this step refer to, or may be performed by, an auto-exposure component as described with reference to FIGS. 4 and 5.

At operation 1115, the system adjusts the virtual gain to obtain a target brightness for the LDR image. The target brightness is the desired brightness of the output image. In some cases, the operations of this step refer to, or may be performed by, an analog auto-exposure component.

At operation 1120, the system adjusts an analog gain to obtain the target brightness for the LDR image after adjusting the virtual gain. For example, the analog gain is a manual adjustment of exposure gain. In some cases, the operations of this step refer to, or may be performed by, an analog auto-exposure component.

At operation 1125, the system computes a luminosity probability density function based on the image statistics. The luminosity probability density function describes a histogram including the distribution of luminosity of pixels. Additionally, or alternatively, luminosity probability density function provides a count of pixels at varying luminosities, which may be considered histogram luminosity values. In some cases, the operations of this step refer to, or may be performed by, a probability density function component as described with reference to FIGS. 4 and 6.

At operation 1130, the system generates a tone-mapping function based on the virtual gain and the luminosity probability density function. Tone-mapping function applies appropriate edits or gains to adjust the brightness in an image by combining the auto-exposure and the tone-mapping curve to provide a high quality LDR image using the HDR image. In some cases, the operations of this step refer to, or may be performed by, a curve generation component as described with reference to FIG. 4.

At operation 1135, the system converts the HDR image to an LDR image based on the tone-mapping function. The LDR image may have improved quality compared to other methods, while maintaining a compressed file size. In some cases, the operations of this step refer to, or may be performed by, a tone-mapping component as described with reference to FIG. 4.

Figure 12:
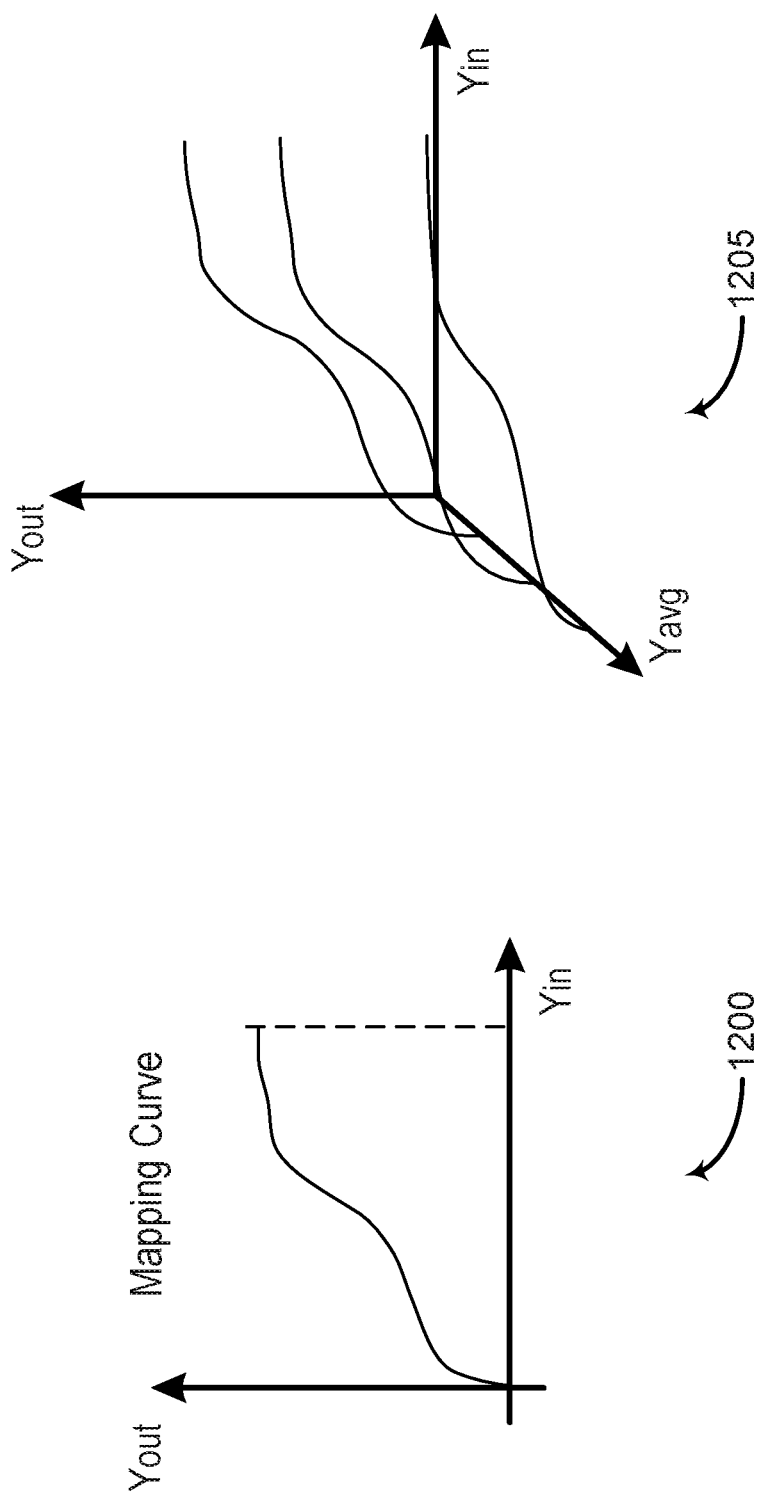
FIG. 12 shows an example of a two-variable tone-mapping function according to aspects of the present disclosure.

FIG. 12 shows an example of a two-variable tone-mapping function according to aspects of the present disclosure. The example shown includes single-variable function 1200 and two-variable function 1205.

One or more embodiments of the present disclosure include different gains to be applied to each area, shown by single-variable function 1200 and two-variable function 1205. TB gain is applied on the image histogram and the number of pixels that became saturated due to TB gain ($N_{sat}$) are calculated. The allowed gain is calculated by defining the percentage of pixels $N_{sat}$ that are allowed to become saturated. For example, the allowed gain is configurable and may be between 15-20%. The allowed gain results in consistency in time and a minimum number of inversions. The allowed gain is applied in the bright areas of the image. TB gain is used for global tone-mapping in dark areas.

As shown in FIG. 12, two mapping curves, i.e., at least one curve suitable for dark areas (correlated with the lowest $Y_{avg}$ value) and at least one other curve suitable for bright areas (correlated with the highest $Y_{avg}$ value), are designed using allowed gain and TB gain. In some examples, hardware supports 32 mapping curves for 32 samples of $Y_{avg}$. For a specific $Y_{avg}$, a convex combination of the two closest mapping curves is applied to get the actual mapping curve. The other 30 mapping curves are calculated by interpolation after setting the two mapping curves for the first and last $Y_{avg}$ values.

The present disclosure describes a joint system of auto exposure and tone-mapping which are used in the automotive industry. One or more embodiments of the disclosure include a method for creating LDR images from HDR images using the joint system. The joint system provides high quality LDR images from 20 to 24 bit input images. The system uses the gains such that the gains can be applied at the end of the chain without affecting other ISP functionality such as image signal-to-noise ratio and avoiding saturation. One or more embodiments include a stable solution that handles dynamic changes, i.e., provides temporal stability while reducing hardware and software complexity. In some cases, the joint system retains safety data used for enabling successive algorithms for advanced driver assisting systems (e.g., ADAS, IVI, autonomous driving, etc.).

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described systems and methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
computing a virtual auto-exposure gain based on image statistics;
computing a luminosity probability density function based on the image statistics;
generating a tone-mapping function by computing a scaled luminosity cumulative distribution function based on the virtual auto-exposure gain and the luminosity probability density function; and
converting a high dynamic range (HDR) image to a low dynamic range (LDR) image based on the tone-mapping function.

2. The method of claim 1, further comprising:
adjusting the virtual auto-exposure gain to obtain a target brightness for the LDR image; and
adjusting an analog gain to obtain the target brightness for the LDR image after adjusting the virtual auto-exposure gain.

3. The method of claim 1, further comprising:
applying a non-linear function to a luminosity of the HDR image to obtain the luminosity probability density function.

4. The method of claim 1, wherein computing the scaled luminosity cumulative distribution function comprises:
computing a luminosity cumulative distribution function based on the luminosity probability density function; and
scaling an input of the luminosity cumulative distribution function based on the virtual auto-exposure gain to obtain the scaled luminosity cumulative distribution function.

5. The method of claim 1, further comprising:
collecting a plurality of exposures using an image sensor; and
generating the HDR image by combining the plurality of exposures.

6. The method of claim 1, further comprising:
computing a plurality of local tone-mapping functions based on the virtual auto-exposure gain and the luminosity probability density function, wherein each of the plurality of local tone-mapping functions corresponds to an average luminosity value;
computing a local average luminosity value for a region surrounding a pixel of the HDR image; and
selecting the tone-mapping function for the pixel from among the plurality of local tone-mapping functions based on the local average luminosity value and the average luminosity value corresponding to the tone-mapping function.

7. The method of claim 1, further comprising:
selecting a plurality of sample values from among a plurality of luminosity values in a range determined by a bit width of the HDR image; and
generating a plurality of linear functions located between the plurality of sample values to approximate a continuous tone-mapping function by comparing a value of each linear function with a corresponding value of the continuous tone-mapping function, wherein the tone-mapping function is generated based on the plurality of linear functions.

8. The method of claim 1, further comprising:
generating a smooth version of the HDR image by denoising the HDR image; and
generating a sharp version of the HDR image by sharpening the smooth version of the HDR image, wherein the tone-mapping function is applied to the sharp version of the HDR image based on the smooth version of the HDR image.

9. The method of claim 8, wherein:
the HDR image has a higher bit width than the LDR image.

10. The method of claim 1, further comprising:
computing white balance data for the HDR image, wherein the tone-mapping function is generated based on the white balance data.

11. A method comprising:
collecting a plurality of exposures using an image sensor;
generating a high dynamic range (HDR) image by combining the plurality of exposures;
computing a virtual gain based on image statistics from the image sensor;
adjusting the virtual gain to obtain a target brightness for a low dynamic range (LDR) image;
adjusting an analog gain to obtain the target brightness for the LDR image after adjusting the virtual gain;
computing a luminosity probability density function based on the image statistics;
generating a tone-mapping function based on the virtual gain and the luminosity probability density function; and
converting the HDR image to the LDR image based on the tone-mapping function.

12. An apparatus comprising:
an auto-exposure component configured to compute a virtual auto-exposure gain based on image statistics;
a probability density function component configured to compute a luminosity probability density function based on the image statistics;
a curve generation component configured to generate a tone-mapping function by computing a scaled luminosity cumulative distribution function based on the virtual auto-exposure gain and the luminosity probability density function; and a tone-mapping component configured to convert a high dynamic range (HDR) image to a low dynamic range (LDR) image based on the tone-mapping function.

13. The apparatus of claim 12, further comprising:
an analog auto-exposure component configured to adjust an analog gain to obtain a target brightness for the LDR image after adjusting the virtual auto-exposure gain to obtain the target brightness for the LDR image.

14. The apparatus of claim 12, further comprising:
a component configured to generate a strictly monotonous function.

15. The apparatus of claim 12, wherein the curve generation component is further configured to:
compute a luminosity cumulative distribution function based on the luminosity probability density function; and
scale an input of the luminosity cumulative distribution function based on the virtual auto-exposure gain to obtain the scaled luminosity cumulative distribution function.

16. The apparatus of claim 12, further comprising:
an image sensor configured to collect a plurality of exposures using an image sensor.

17. The apparatus of claim 16, wherein the image sensor further includes:
an image statistics component configured to collect image statistics from the image sensor.

18. The apparatus of claim 12, wherein the curve generation component is further configured to:
compute a plurality of local tone-mapping functions based on the virtual auto-exposure gain and the luminosity probability density function, wherein each of the plurality of local tone-mapping functions corresponds to an average luminosity value,
compute a local average luminosity value for a region surrounding a pixel of the HDR image; and
select the tone-mapping function for the pixel from among the plurality of local tone-mapping functions based on the local average luminosity value and the average luminosity value corresponding to the tone-mapping function.

19. The apparatus of claim 12, further comprising:
a noise reduction component configured to generate a smooth version of the HDR image by denoising the HDR image; and
a sharp adder configured to generate a sharp version of the HDR image by sharpening the smooth version of the HDR image, wherein the tone-mapping function is applied to the sharp version of the HDR image based on the smooth version of the HDR image.

20. The apparatus of claim 12, further comprising:
a white balance component configured to compute white balance data for the HDR image, wherein the tone-mapping function is generated based on the white balance data.

* * * * *